(No Model.)
A. L. CLARK.
DEVICE FOR OPERATING ROLLER AWNINGS.
No. 559,678.  Patented May 5, 1896.
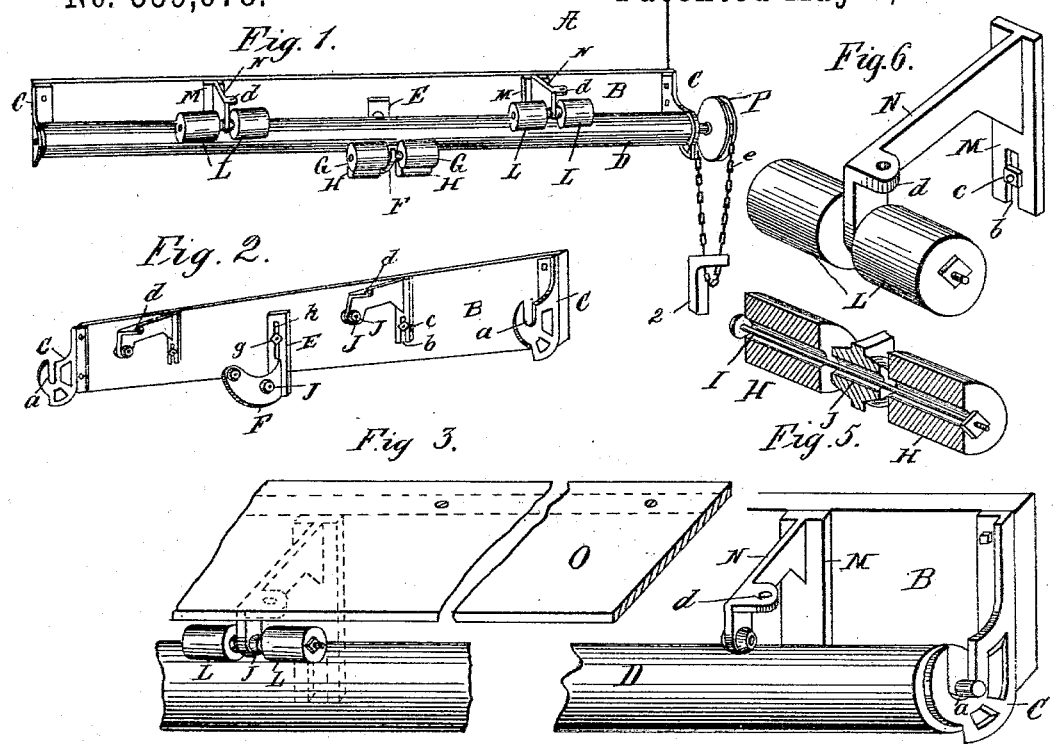
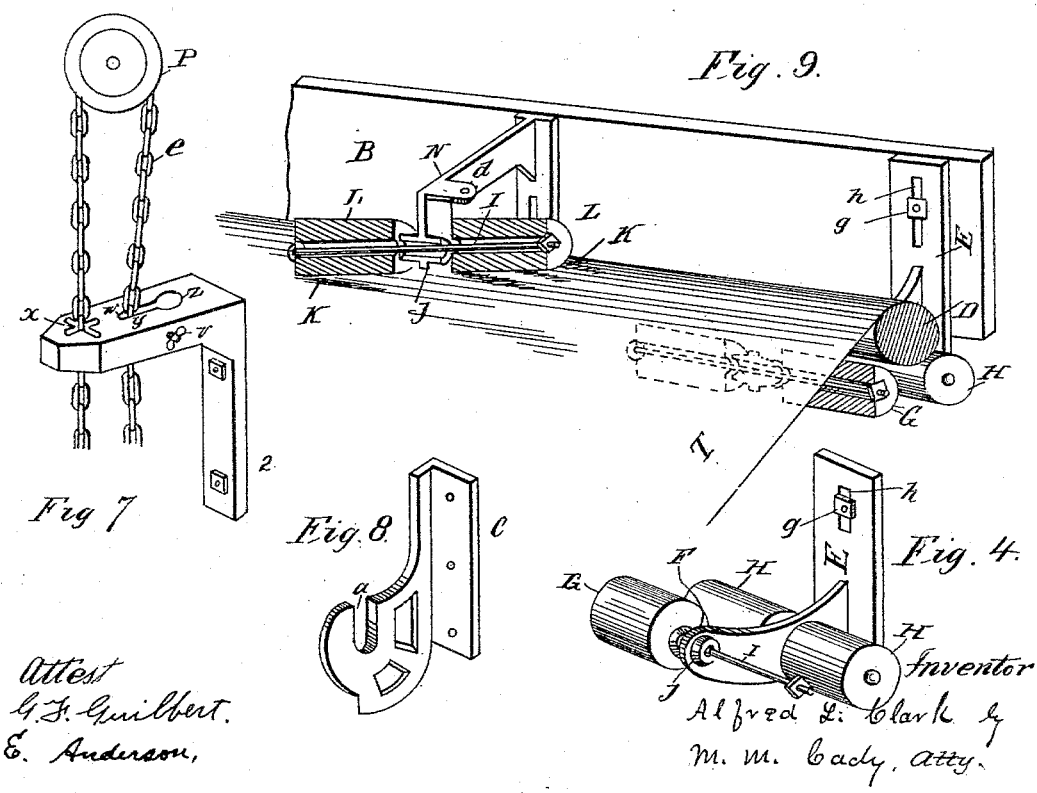
Attest
G. F. Guilbert.
E. Anderson.
Inventor
Alfred L. Clark
by M. M. Cady, atty.

UNITED STATES PATENT OFFICE.

ALFRED L. CLARK, OF DUBUQUE, IOWA.

DEVICE FOR OPERATING ROLLER-AWNINGS.

SPECIFICATION forming part of Letters Patent No. 559,678, dated May 5, 1896.

Application filed January 28, 1896. Serial No. 577,215. (No model.)

*To all whom it may concern:*

Be it known that I, ALFRED L. CLARK, a citizen of the United States, residing at Dubuque, in the county of Dubuque and State of Iowa, have invented certain new and useful Improvements in Devices for Operating Roller-Awnings; and I hereby declare the following to be a full, clear, and exact description of the invention, which will enable others skilled in the art to which it appertains to make and use the same.

My invention relates to that class known as "appliances for operating roller-awnings;" and one of the objects consists in a simple means to enable the canvas to be rolled and unrolled with ease without injuring the same, whether the canvas be attached to rollers of unusual length or diameter.

Another object is to compensate for the usual doubling or crimping which occurs in the rolling and unrolling of the awning-cloth, whereby such crimping shall not interfere with the ready and easy operation of the roller and the canvas shall be subjected to the least possible strain.

With these and other minor objects in view attention is invited to the following specification and accompanying drawings, forming a part thereof, in which—

Figure 1 shows a perspective of my invention with wheel and chain for operating the roller, the awning-cloth and covering removed. Fig. 2 is a perspective of the plate with brackets attached. Fig. 3 is a front elevation of covering for roller with part broken away. Fig. 4 is a perspective of one of the brackets and rollers with one roller removed. Fig. 5 is a sectional view of the front rollers shown in Fig. 4 and showing bearing of roller-axles. Fig. 6 is a perspective of another bracket carrying rollers. Fig. 7 shows an end view of the roller-wheel with chain and bracket beneath for locking and guiding the chain. Fig. 8 is a perspective of one of the brackets which carries the awning-roller, and Fig. 9 is a part front elevation and part sectional view showing operation of the device.

Like letters of reference denote corresponding parts in all of the drawings.

In the drawings, A represents the side of a building, to which a plate or plank B is securely attached. At or near the outer end of B are fastened the brackets C C (shown in Fig. 8) in the same horizontal plane with each other and having their sides parallel with each other. The brackets C are supplied with notches or bearings *a a*, in which the awning-roller D revolves. About the middle of the plate B and in a plane below the bracket C is adjustably secured a bracket E by one or more large-headed bolts *g* in a slot *h* in the base of said bracket E. An arm F projects out from the base of said bracket E and forms a bearing for the axle of four rollers G G and H H, as seen in Fig. 4. The rollers G both revolve on the same axle I, (shown in Fig. 5,) and the rollers H have a common axle similar to the axle I of the rollers G. A separate hub or bearing J for each of these axles is cast integral with the arm F, one in the outer end and the other near the base of the bracket, as shown in Fig. 4. Said bearing J is made considerably larger than the axle I for the following reason: In rolling up the awning-cloth, especially where the roller D is of unusual length, the awning-cloth will frequently crimp or double upon itself, as shown at K in Fig. 9, and if there be no provision made for such doubling the cloth will be torn or so severely strained that it will last only a short time. By setting these rollers on a loose bearing and also the rollers L L, presently to be described, in the same manner, all of these rollers will tilt or tip, as shown in said Fig. 9, and allow the folded cloth to pass between them without any strain thereof.

To the plate B are adjustably secured in a plane slightly above the brackets C two or more other brackets M, according to the length of the roller D, by large-headed bolts *c* in slot *b*. An arm N of the bracket M furnishes a bearing for the axle of the roller L. This bearing is constructed in the same manner as the bearings J for the rollers G and H, and for the same purpose. The arm N is set in a slight incline, as shown in Fig. 6, for the purpose of sustaining the covering, presently to be described. There is also cast integral with said arm a lip *d*, which is perforated to receive a screw for holding said covering. A plate of wood or metal O is fastened at one edge to the upper edge of the plate B and projects out upon the arms N of the brackets M and screwed to said brackets by screws passing through the perforations of the lip $d$, as shown in Figs. 3 and 6. The object of this is that when the awning-cloth is rolled up upon the roller D it will be at rest under the covering O and protected from injury by the action of the weather.

It is manifest that all of the above-described brackets may be secured directly to the side of the building; but I prefer to place them on the plate B.

To the outer end of said roller D is fastened a wheel P, over which a chain $e$ wraps, for operating the roller D. (Shown in Fig. 7.) To the wall below the wheel P and a little to one side is secured a bracket Q, (shown in Fig. 7,) one arm of which projects out at right angles to the building and is perforated by two holes $x$ and $y$, the hole $x$ being in the form of a cross for the purpose of guiding the chain in its upward and downward movement and prevent it from twisting, especially when it travels over the wheel P. The other perforation $y$ is designed with a round hole $z$, out of which a longitudinal slot $v$ is cut. The use of this hole $y$ is to allow the chain to travel freely through the round part $z$ of the hole and to lock the chain in any position by simply sliding the chain into the slot $w$. Instead of the hole $y$ there might be a loop or hook on the outside of the horizontal arm. To prevent any possibility of the chain sliding out of the slot $w$ into the hole $z$, there is provided a key $v$, which is inserted in the side of the bracket-arm $k$ and across the slot $w$.

The manner of operating my device is as follows: Starting with the awning-cloth unrolled and the roller D in the notches $a$ of the bracket C the bracket E is adjusted until the rollers H come in contact with the under side of the roller D, and the brackets M are also adjusted until the lower surface of the rollers L is in the same horizontal plane with the upper surface of the roller D and the awning-cloth resting upon the roller G and in contact with the rollers L. The operator then withdraws the key $v$ and at the same time grasps the chain $e$ and draws it from the slot $w$ into the hole $z$. Then by drawing down upon the chain the roller D will be revolved and wind up the cloth thereon. As the rolling advances, if the cloth T should commence to double, as shown in Fig. 9, the rollers L and the rollers G in their bearings will assume the position shown in Fig. 9 and permit the folded portions of the cloth to readily pass up under the rollers L and over the rollers G. It will be seen that by setting the rollers L at some distance from the side of the rollers G the awning-cloth will be largely prevented from doubling, and if it should double or crimp there is sufficient provision made by the axles in the bearings in these rollers to allow the cloth to pass between and not tear or permit any overstrain thereof. When the cloth is fully rolled upon the roller D, the whole will rest under the covering O, where it will be protected from the action of the weather, and when the awning-cloth is fully rolled up the chain is slid into the slot $w$, and, if necessary, the key $v$ may be slid through the slot and prevent the chain from being drawn out.

It will be noticed that as the wheel P is revolved and the chain passes up through the hole it will always maintain the same relative position to the roller and will not twist or turn.

It is manifest that modifications in the manner of construction and mode of operation may be made without departing from the spirit of my invention.

Having now described my invention, what I claim, and desire to secure by Letters Patent, is—

1. In a device for operating roller-awnings, a central bracket carrying two pairs of rollers, each pair revolving on a common axle in a bearing adapted to permit said rollers to tilt endwise, one or more brackets adjustably set on each side of central bracket carrying one pair of rollers upon a common axle in a bearing also adapted to permit an endwise-tilting movement to said rollers the awning and awning-roller; all combined and arranged to operate as and for the purposes shown.

2. A device for operating roller-awnings, consisting of an awning-roller carrying the awning-cloth, a central bracket adjustably set beneath the awning-roller, and carrying two pairs of rollers, each pair revolving on a common axle in bearings which admit of an endwise-tilting movement to said rollers, one or more brackets adjustably set on each side of said central bracket and above the awning-roller, carrying one pair of rollers revolving upon a common axle and also adapted to tilt endwise and means for rolling and unrolling said awning-roller, for the purposes shown.

3. In a device for operating roller-awnings, a roller pivoted in bearings at its outer ends upon which the awning-cloth is rolled, a bracket adjustably secured to the wall, having an arm extending beneath at about the middle of said roller and carrying smaller rollers that have a tilting motion, one or more brackets adjustably set on each side of said central bracket and each carrying rollers that have a tilting motion which project over the awning-roller and means for rolling and unrolling the cloth on the awning-roller, for the purposes shown.

4. In a device for operating roller-awnings, consisting of a roller D, brackets C, bracket E, carrying rollers G, and H, having axles I which have a tilting motion, and hubs J, brackets M, having rollers L, which also have a tilting motion and hubs J, bracket Q, wheel P, and chain $e$, all arranged and combined substantially as described and shown.

5. In a device for operating roller-awnings, a bracket E, with slot $h$, and bolt $g$, for adjusting the same and hubs J, J, and one or more brackets M, adjustably set upon each side of the bracket E, having hubs J; both of said brackets being provided with supporting-rollers which have a tilting movement all combined for the purposes shown.

6. In a device for operating roller-awnings, a plate B, to which are secured at its outer ends, brackets C, carrying the roller-awning, bracket E, adjustably secured to said plate B, at or near its center with one arm projecting below the roller-awning and carrying two pairs of rollers, having their bearings in the hubs J, and having a tilting motion and one or more brackets M, adjustably secured to said plate B, upon each side of the bracket E, and carrying one pair of rollers over the awning-roller in bearings J, and also having a tilting motion all combined to operate substantially as described and shown.

In testimony whereof I hereunto affix my signature in the presence of two witnesses.

ALFRED L. CLARK.

Witnesses:
M. M. CADY,
J. E. ROSSER.